(12) United States Patent
Tsai et al.

(10) Patent No.: US 8,665,621 B2
(45) Date of Patent: Mar. 4, 2014

(54) POWER SUPPLY WITH OPEN-LOOP PROTECTION AND SHORT-CIRCUIT PROTECTION

(75) Inventors: Meng-Jen Tsai, Hsinchu (TW); Ho-Tzu Chueh, Taipei County (TW); Cheng-Chi Hsueh, Taipei County (TW); Chien-Yuan Lin, Taipei County (TW)

(73) Assignee: System General Corp., Taipei Hsien (TW)

( * ) Notice: Subject to any disclaimer, the term of this patent is extended or adjusted under 35 U.S.C. 154(b) by 297 days.

(21) Appl. No.: 13/283,907

(22) Filed: Oct. 28, 2011

(65) Prior Publication Data

US 2012/0106205 A1 May 3, 2012

(30) Foreign Application Priority Data

Nov. 1, 2010 (CN) .......................... 2010 1 0535323

(51) Int. Cl.
*H02M 3/24* (2006.01)
(52) U.S. Cl.
USPC ............................... 363/97; 363/71; 323/271
(58) Field of Classification Search
USPC ......... 323/222, 225, 266, 271, 275, 282–290; 363/16–20, 21.01, 21.12, 21.15, 21.18, 363/95, 97, 127, 132; 361/42, 43, 44, 93.1
See application file for complete search history.

(56) References Cited

U.S. PATENT DOCUMENTS

| 6,093,186 A * | 7/2000 | Goble ............................. 606/34 |
| 6,944,034 B1 * | 9/2005 | Shteynberg et al. ........ 363/21.13 |
| 7,596,005 B2 * | 9/2009 | Balakrishnan et al. .... 363/21.15 |
| 7,724,547 B1 * | 5/2010 | Zheng et al. ............... 363/21.13 |
| 7,893,678 B2 * | 2/2011 | Blanken ........................ 323/285 |

* cited by examiner

*Primary Examiner* — Rajnikant Patel
(74) *Attorney, Agent, or Firm* — Rosenberg, Klein & Lee

(57) ABSTRACT

The power supply according to the present invention comprises a transformer, a power switch, a signal generating circuit, an on-time detection circuit, and a delay circuit. The transformer receives an input voltage and generates an output voltage. The power switch switches the transformer for regulating the output voltage. The signal generating circuit generates a switching signal for controlling switching of the power switch. The on-time detection circuit detects an on-time of the power switch and generates a short-circuit signal. The delay circuit counts to a first delay time or to a second delay time in response to a feedback signal of the power supply and the short-circuit signal to generate a turn off signal for controlling the signal generating circuit to latch the switching signal.

10 Claims, 7 Drawing Sheets

POWER SUPPLY WITH OPEN-LOOP PROTECTION AND SHORT-CIRCUIT PROTECTION

FIELD OF THE INVENTION

The present invention relates generally to a power supply, and more specifically, the present invention relates to a power supply with open-loop protection and short-circuit protection.

BACKGROUND OF THE INVENTION

In general, power supplies can provide stable voltage and current. In order to comply with safety, power supplies should provide open-loop protection and short-circuit protection for ensuring the power supplies and the application circuits of the load side free from influences. FIG. 1 shows a circuit diagram of the conventional power supply with open-loop protection. The conventional power supply comprises a transformer $T_1$, a reset circuit 14, a signal generating circuit 10, an oscillator 12, a power switch $Q_1$, a feedback detection circuit 16, a delay circuit 18, and a driving circuit 20.

As shown in FIG. 1, the transformer $T_1$ has a primary winding $N_P$ and a secondary winding $N_S$ for storing energy and converting power. The transformer $T_1$ is coupled to an input voltage $V_{IN}$ of the power supply for generating an output voltage $V_O$. The power switch $Q_1$ switches the transformer $T_1$ for converting the energy stored in the primary winding $N_P$ to the secondary winding $N_S$. The energy converted to the secondary winding $N_S$ is rectified by an output rectifier $D_O$ and an output capacitor $C_O$ for generating the output voltage $V_O$. A current sensing resistor $R_S$ is connected to the power switch $Q_1$ in series. The current sensing resistor $R_S$ generates a current signal $V_{CS}$ in response to a primary-side switching current $I_P$ of the transformer $T_1$. In addition, the output voltage $V_O$ of the power supply provides a feedback signal $V_{FB}$ to the reset circuit 14 and the feedback detection circuit 16 by means of feedback.

The reset circuit 14 comprises a logic circuit 144, a power limiting comparator 146, and a pulse-width-modulation (PWM) comparator 148. The reset circuit 14 generates a clear signal CLR in response to the current signal $V_{CS}$, a power limiting signal $V_{LMT}$, and the feedback signal $V_{FB}$ for turning off a switching signal $V_{PWM}$. An input terminal of the power limiting comparator 146 and an input terminal of the PWM comparator 148 are coupled to the current sensing resistor $R_S$ for receiving the current signal $V_{CS}$. The other input terminal of the power limiting comparator 146 receives the power limiting signal $V_{LMT}$. The other input terminal of the PWM comparator 148 receives the feedback signal $V_{FB}$.

When the current signal $V_{CS}$ is higher than the power limiting signal $V_{LMT}$, an output terminal of the power limiting comparator 146 will output an over-current signal OC with a low voltage level. Besides, when the current signal $V_{CS}$ is higher than the feedback signal $V_{FB}$, an output terminal of the PWM comparator 148 will output a feedback control signal CNTR with a low voltage level. Both input terminals of the logic circuit 144 are coupled to the output terminals of the power limiting comparator 146 and the PWM comparator 148. Thereby, the output terminal of the logic circuit 144 will generate the clear signal CLR with a low voltage level in response to the over-current signal OC and/or the feedback control signal CNTR for turning off the switch signal $V_{PWM}$. In other words, the reset circuit 14 determines the logic level of the clear signal CLR in response to the logic level of the feedback control signal CNTR or the logic level of the over-current signal OC.

The signal generating circuit 10 comprises a logic circuit 101, a flip-flop 103, and a logic circuit 105. The logic circuit 101 is an inverter. An input terminal of the logic circuit 101 is coupled to the oscillator 12 for receiving a clock signal PLS outputted by the oscillator 12. An output terminal of the logic circuit 101 is coupled to a clock input terminal CK of the flip-flop 103 for driving the flip-flop 103. An input terminal D of the flip-flop 103 is coupled to an output terminal of the delay circuit 18. An output terminal Q of the flip-flop 103 is coupled to an input terminal of the logic circuit 105. The other input terminal of the logic circuit 105 receives the clock signal PLS via the logic circuit 101. An output terminal of the logic circuit 105 generates the switching signal $V_{PWM}$. The logic circuit 105 is an AND gate. The reset input terminal R of the flip-flop 103 is coupled to an output terminal of the reset circuit 14 for receiving the clear signal CLR.

The signal generating circuit 10 is coupled to the output terminals of the oscillator 12 and the reset circuit 14. The signal generating circuit 10 generates the switching signal $V_{PWM}$ in response to the clock signal PLS outputted by the oscillator 12. The driving circuit 20 receives the switching signal $V_{PWM}$ for generating a driving signal $V_G$. The driving signal $V_G$ is used for controlling switching of the power switch $Q_1$ for regulating the output voltage $V_O$. Because the switching signal $V_{PWM}$ is provided to the driving circuit 20 for generating the driving signal $V_G$, and therefore the switching signal $V_{PWM}$ is used for controlling switching of the power switch $Q_1$. The signal generating circuit 10 adjusts periodically the pulse width of the switching signal $V_{PWM}$ in response to the clear signal CLR outputted by the reset circuit 14. It makes that the output voltage $V_O$ of the power supply is regulated stably and the output power is limited.

Referring to FIG. 1, both input terminals of the feedback detection circuit 16 receives respectively the feedback signal $V_{FB}$ and a limit signal $V_{LIMT}$ for generating a pull-high signal $S_{PH}$. When the power supply operates normally, the feedback signal $V_{FB}$ is lower than the limit signal $V_{LIMT}$. At this moment, an output terminal of the feedback detection circuit 16 generates the pull-high signal $S_{PH}$ with a low voltage level. The delay circuit 18 does not perform counting, but outputs directly a turn off signal $S_{OFF}$ with a high voltage level to the signal generating circuit 10 when the delay circuit 18 receives the pull-high signal $S_{PH}$ with the low voltage level. The signal generating circuit 10 does not latch the switching signal $V_{PWM}$ when the signal generating circuit 10 receives the turn off signal $S_{OFF}$ with the high voltage level.

When the output terminal of the power supply is open-loop, the voltage level of the feedback signal $V_{FB}$ is pulled to a supply voltage $V_{CC}$ through a pull-up resistor $R_{PH}$. When the voltage level of the feedback signal $V_{FB}$ is pulled high and higher than the limit signal $V_{LIMT}$, the output terminal of the feedback detection circuit 16 will generate the pull-high signal $S_{PH}$ with the high voltage level. The delay circuit 18 performs counting in response to the pull-high signal $S_{PH}$ with the high voltage level, and generates the turn off signal $S_{OFF}$ with the low voltage level after the delay circuit 18 counts to a delay time. The signal generating circuit 10 latches the switch signal $V_{PWM}$ in response to the turn off signal $S_{OFF}$ with the low voltage level, which means latching the driving signal $V_G$. Thereby, when the voltage level of the feedback signal $V_{FB}$ is pulled high, the feedback detection circuit 16 and the delay circuit 18 will drive the signal generating circuit 10 to latch the switching signal $V_{PWM}$ for performing the open-loop protection.

Furthermore, when the power supply is short circuited, the voltage level of the feedback signal $V_{FB}$ will also be pulled high to the supply voltage $V_{CC}$ through the pull-up resistor $R_{PH}$. The feedback detection circuit 16 will then generate the pull-high signal $S_{PH}$ with the high voltage level. The delay circuit 18 will perform counting, and generates the turn off signal $S_{OFF}$ with the low voltage level after the delay circuit 18 counts to the delay time. The signal generating circuit 10 will latch the switching signal $V_{PWM}$ in response to the turn off signal $S_{OFF}$ with the low voltage level for protecting the power supply and the application circuits of the load side. The delay time for short-circuit protection is the same as the delay time for open-loop protection. However, when the power supply is short-circuited, the power supply or the application circuits of the load side can be destroyed in a short time. Therefore, for enhancing safety of the power supply, the signal generating circuit 10 should latch the switching signal $V_{PWM}$ as soon as possible when the power supply is short-circuited. Accordingly, it has become a major subject for modern design of a power supply that the power supply can correctly distinguish between open-loop and short-circuit situations, and can perform short-circuit protection as soon as possible when the power supply is short-circuited.

SUMMARY

An objective of the present invention is to provide a power supply with open-loop protection and short-circuit protection. When the feedback signal is pulled high, the power supply according to the present invention detects the on-time of the power switch by an on-time detection circuit for distinguishing between open-loop and short-circuit situations, and thereby determining the delay time of the delay circuit. Accordingly, when the power supply is short-circuited, it can perform short-circuit protection in a short time.

The power supply with open-loop protection and short-circuit protection according to the present invention comprises a transformer, a power switch, a signal generating circuit, an on-time detection circuit, and a delay circuit. The transformer receives an input voltage for generating an output voltage. The power switch is coupled to the transformer and switches the transformer for regulating the output voltage. The signal generating circuit generates a switching signal for controlling switching of the power switch. The on-time detection circuit detects an on-time of the power switch for generating a short-circuit signal. The delay circuit generates a turn off signal in response to the short-circuit signal and a feedback signal of the power supply. The turn off signal controls the signal generating circuit to latch the switching signal. The on-time detection circuit detects the on-time of the power switch for distinguishing between open-loop and short-circuit situations, and hence generating the short-circuit signal. The delay circuit counts to a first delay time or to a second delay time in response to the short-circuit signal. Thereby, the delay circuit generates the turn off signal for controlling the signal generating circuit to latch the switching signal after the delay circuit counts to different delay time (the first delay time or the second delay time) in response to different situations (short-circuit or open-loop). Consequently, the power supply can be properly protected as soon as possible.

DETAILED DESCRIPTION

In order to make the structure and characteristics as well as the effectiveness of the present invention to be further understood and recognized, the detailed description of the present invention is provided as follows along with embodiments and accompanying figures.

Figure 2:
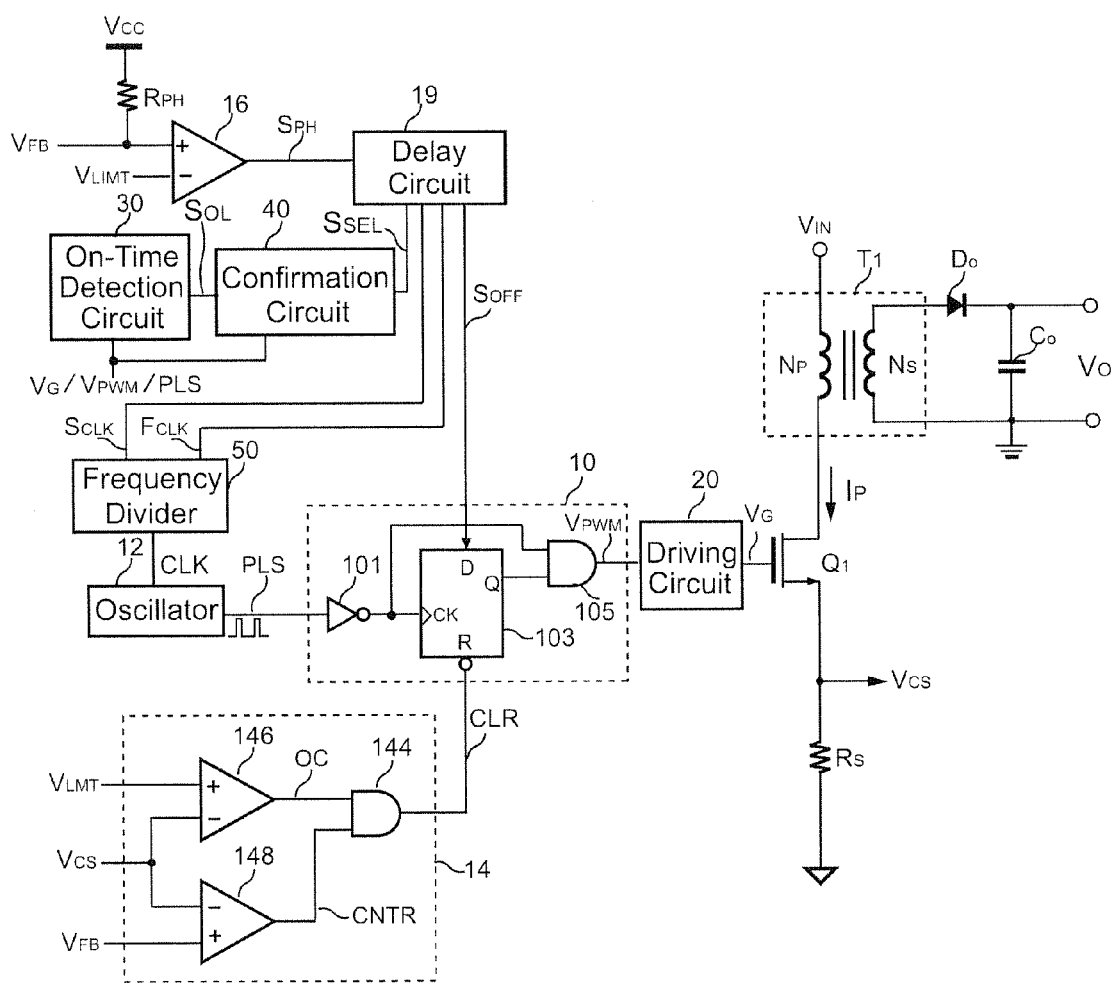
FIG. 2 shows a circuit diagram of a first embodiment of the power supply with open-loop protection and short-circuit protection according to the present invention.

FIG. 2 shows a circuit diagram of a first embodiment of the power supply with open-loop protection and short-circuit protection according to the present invention.

Figure 1:
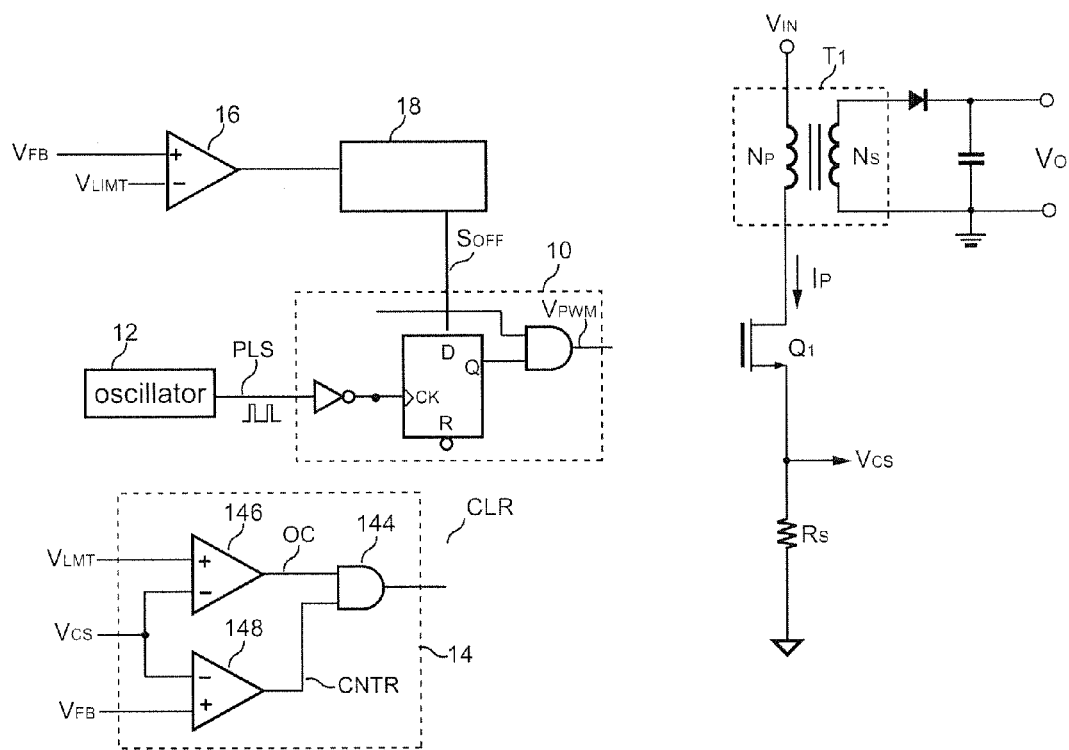
FIG. 1 shows a circuit diagram of the conventional power supply with open-loop protection.

In addition to the components of the conventional power supply shown in FIG. 1, the present invention further comprises an on-time detection circuit 30, a confirmation circuit 40, and a frequency divider 50. The on-time detection circuit 30 receives the driving signal $V_G$ or the switching signal $V_{PWM}$ for detecting an on-time of the power switch $Q_1$ and generating a short-circuit signal $S_{OL}$. In addition, the on-time detection circuit 30 further receives the clock signal PLS outputted by the oscillator 12. The short-circuit signal $S_{OL}$ is provided to the confirmation circuit 40. The confirmation circuit 40 generates a selection signal $S_{SEL}$ in response to the short-circuit signal $S_{OL}$ and a reference signal. The reference signal can be the switching signal $V_{PWM}$, or the driving signal $V_G$ correlated to the switching signal $V_{PWM}$ or the clock signal PLS correlated to the switching signal $V_{PWM}$. The clock signal PLS comes from the oscillator 12 and is generated synchronously with the driving signal $V_G$.

When the power supply is short-circuited, the output current will increase and the output voltage $V_O$ will decrease. Because the output voltage $V_O$ is directly proportional to the input voltage $V_{IN}$, the turn ratio of the primary winding $N_P$ to the secondary winding $N_S$, and the on-time of the power switch $Q_1$, in which the input voltage $V_{IN}$ and the turn ratio are constant, the on-time of the power switch $Q_1$ thus is shortened when the output voltage $V_O$ decreases. In other words, when the voltage level of the feedback signal $V_{FB}$ is higher than the limit signal $V_{LIMT}$, the feedback detection circuit 16 generates the pull-high signal $S_{PH}$ with the high voltage level, and the on-time of the power switch $Q_1$ detected by the on-time detection circuit 30 is lower than a time threshold, it represents that the power supply is short-circuited. The time threshold is predetermined.

Moreover, when the feedback detection circuit 16 generates the pull-high signal $S_{PH}$ with the high voltage level, and the on-time of the power switch $Q_1$ is continuously higher than the predetermined time threshold, it means that the power supply is open-looped. The on-time detection circuit 30 is utilized to detect the on-time of the power switch $Q_1$ and confirm occurrence of the short-circuit situation according to the present invention. Besides, the confirmation circuit 40 is utilized to confirm occurrence of the open-loop situation. The confirmation circuit 40 is coupled to the on-time detection circuit 30 and receives the short-circuit signal $S_{OL}$ and the reference signal for confirming that the on-time of the power switch $Q_1$ is continuously higher than the predetermined time threshold, and generating the selection signal $S_{SEL}$.

The delay circuit 19 is coupled to the feedback detection circuit 16 and the confirmation circuit 40 and receives the pull-high signal $S_{PH}$ and the selection signal $S_{SEL}$. The delay circuit 19 performs counting in response to the pull-high signal $S_{PH}$ with high voltage level and the selection signal $S_{SEL}$. The delay circuit 19 will generate a turn off signal $S_{OFF}$ after the delay circuit 19 counts to a first delay time or a second delay time. The first delay time and the second delay time are predetermined. The signal generating circuit 10 will latch the switching signal $V_{PWM}$ in response to the turn off signal $S_{OFF}$ for performing short-circuit protection or open-loop protection. Because the voltage level of the pull-high signal $S_{PH}$ is determined by the voltage level of the feedback signal $V_{FB}$, the delay circuit 19 starts counting in response to the feedback signal $V_{FB}$ for driving the signal generating circuit 10 to perform short-circuit protection or open-loop protection.

The first delay time is shorter than the second delay time. The first delay time corresponds to the short-circuit protection. The second delay time corresponds to the open-loop protection. Because the confirmation circuit 40 generates the selection signal $S_{SEL}$ in response to the short-circuit signal $S_{OL}$ to control the delay circuit 19 counting to the first delay time or the second delay time for generating the turn off signal $S_{OH}$ thereafter, the delay circuit 19 counts to the first delay time or the second delay time in response to the short-circuit signal $S_{OL}$ for performing the open-loop protection or the short-circuit protection.

The frequency divider 50 is coupled to the oscillator 12 and receives a fundamental clock signal CLK generated by the oscillator 12. The frequency divider 30 frequency-divides the fundamental clock signal CLK to generate a first clock signal $F_{CLK}$ and a second clock signal $S_{CLK}$. The frequency of the first clock signal $F_{CLK}$ is higher than that of the second clock signal $S_{CLK}$. It means that the period of the first clock signal $F_{CLK}$ is shorter than that of the second clock signal $S_{CLK}$. The first clock signal $F_{CLK}$ and the second clock signal $S_{CLK}$ are transmitted to the delay circuit 19. The delay circuit 19 selects the first clock signal $F_{CLK}$ or the second clock signal $S_{CLK}$ as the time base in response to the selection signal $S_{SEL}$ for counting to the first delay time or the second delay time.

Figure 3:
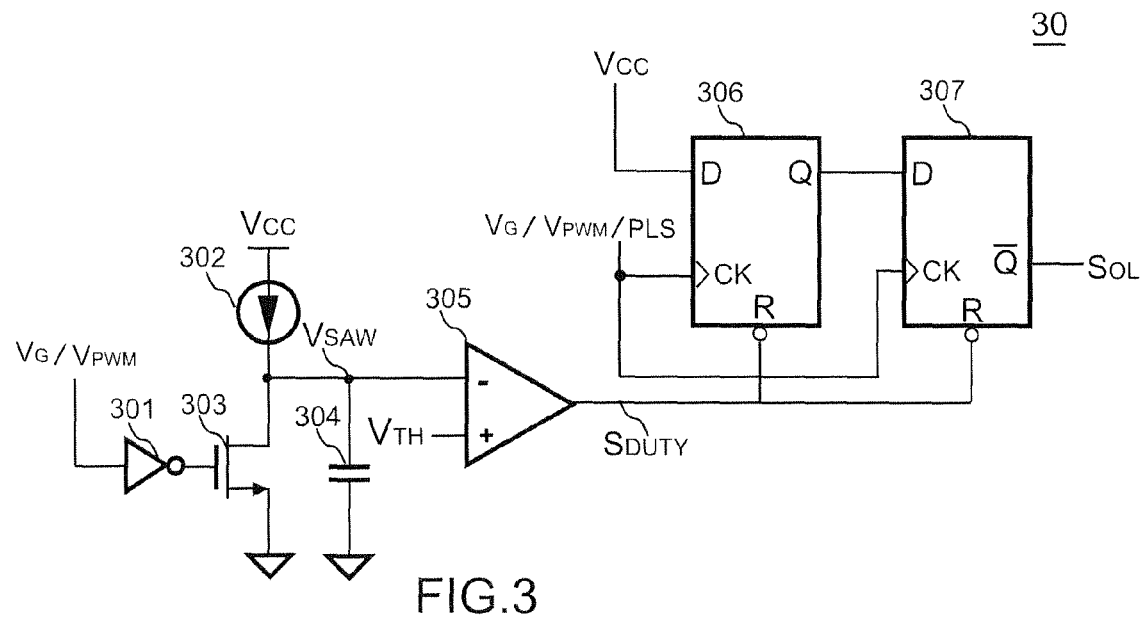
FIG. 3 shows a circuit diagram of an embodiment of the on-time detection circuit according to the present invention.

FIG. 3 shows a circuit diagram of an embodiment of the on-time detection circuit according to the present invention. As shown in the figure, the on-time detection circuit 30 comprises a sawtooth signal generating circuit, a comparator 305, and a counting circuit. The sawtooth signal generating circuit includes an inverter 301, a current source 302, a transistor 303, and a capacitor 304. The sawtooth signal generating circuit generates a sawtooth signal $V_{SAW}$ in response to the on-time of the power switch $Q_1$. An input terminal of the inverter 301 receives the driving signal $V_G$ or the switching signal $V_{PWM}$. An output terminal of the inverter 301 is coupled to a gate of the transistor 303 for controlling turn on and turn off of the transistor 303. A source of the transistor 303 is coupled to the ground. The current source 302 is coupled between the supply voltage $V_{CC}$ and a terminal of the capacitor 304 for charging the capacitor 304. The other terminal of the capacitor 304 is coupled to the ground. A drain of the transistor 303 is coupled to the capacitor 304 for discharging the capacitor 304.

When the driving signal $V_G$ or the switching signal $V_{PWM}$ is enabled, the inverter 301 turns off the transistor 303, and the current source 302 charges the capacitor 304. When the driving signal $V_G$ or the switching signal $V_{PWM}$ is disenabled, the inverter 301 turns on the transistor 303, and the capacitor 304 is discharged. Thereby, the sawtooth signal $V_{SAW}$ is generated at the capacitor 304. Because the enabling time of the driving signal $V_G$ or the switching signal $V_{PWM}$ corresponds to the on-time of the power switch $Q_1$, the sawtooth signal generating circuit generates the sawtooth signal $V_{SAW}$ in response to the on-time of the power switch $Q_1$. A negative input terminal and a positive input terminal of the comparator 305 receives respectively the sawtooth signal $V_{SAW}$ and a threshold signal $V_{TH}$ for comparing the sawtooth signal $V_{SAW}$ with the threshold signal $V_{TH}$. An output terminal of the comparator 305 generates a duty signal $S_{DUTY}$.

Figure 6A:
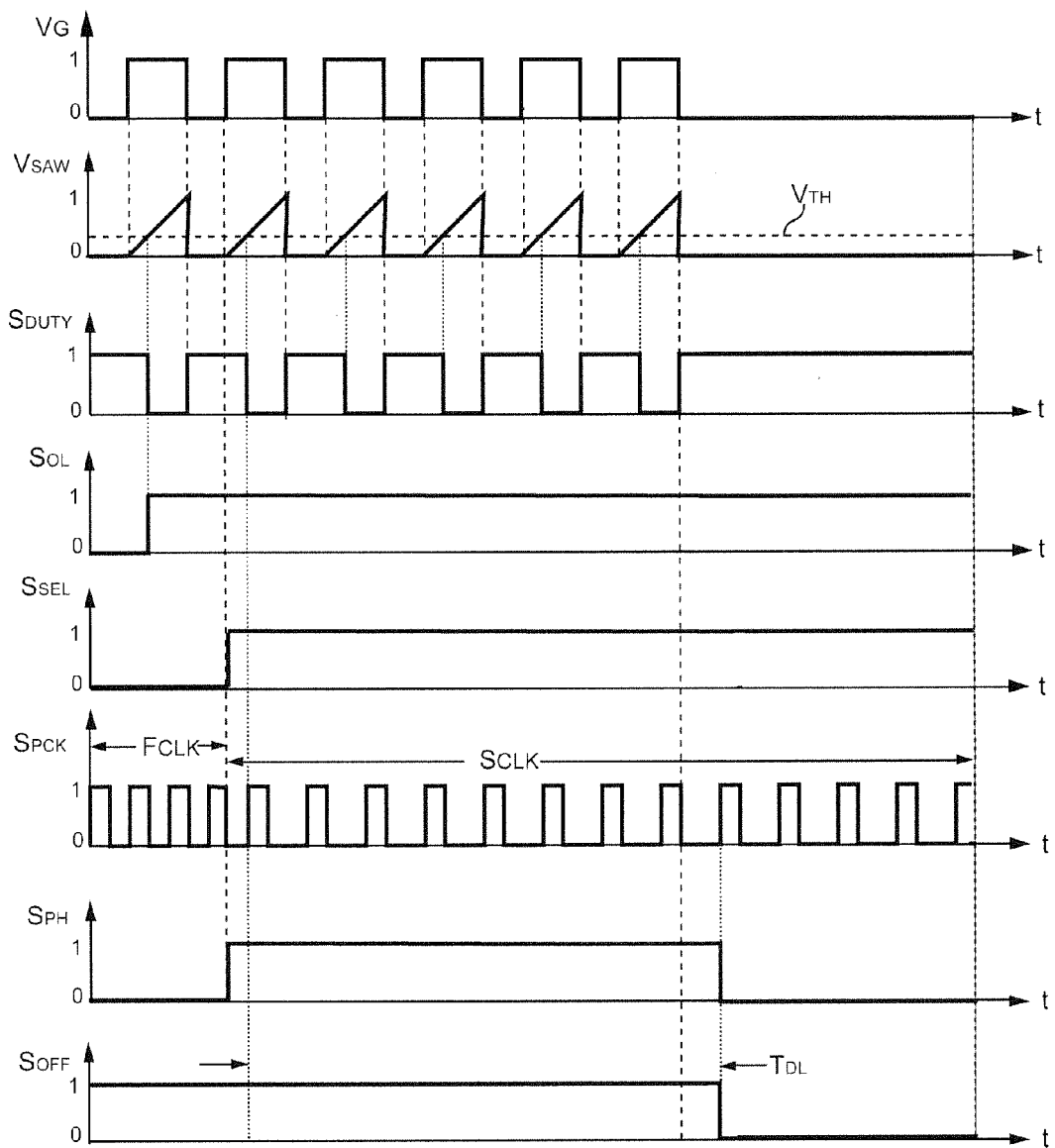
FIG. 6A and FIG. 6B show waveforms of the power supply with open-loop protection and short-circuit protection according to the present invention.

As shown in FIG. 6A, when the sawtooth signal $V_{SAW}$ is lower than the threshold signal $V_{TH}$, the voltage level of the duty signal $S_{DUTY}$ is high-level. When the sawtooth signal $V_{SAW}$ is higher than the threshold signal $V_{TH}$, the voltage level of the duty signal $S_{DUTY}$ is low-level. In other words, when the on-time of the power switch $Q_1$ is short, the sawtooth signal $V_{SAW}$ is lower than the threshold signal $V_{TH}$ and the voltage level of the duty signal $S_{DUTY}$ is high-level. When the on-time of the power switch $Q_1$ is long, the sawtooth signal $V_{SAW}$ is higher than the threshold signal $V_{TH}$ and the voltage level of the duty signal $S_{DUTY}$ is low-level. The voltage level of the sawtooth signal $V_{TH}$ is the time threshold. If the voltage level of the duty signal $S_{DUTY}$ is high-level, it means that the on-time of the power switch $Q_1$ is lower than the time threshold. If the voltage level of the duty signal $S_{DUTY}$ is low-level, it means that the on-time of the power switch $Q_1$ is higher than the time threshold.

The counting circuit includes flip-flops 306 and 307. The counting circuit is used for confirming that the on-time of the power switch $Q_1$ is not temporarily lower than the time threshold caused by a false action of the power supply. Clock input terminals CK of the flip-flops 306 and 307 receive a trigger signal for performing counting. The trigger signal can be the driving signal $V_G$, the switching signal $V_{PWM}$, or the clock signal PLS. An input terminal D of the flip-flop 306 receives the supply voltage $V_{CC}$. An input terminal D of the flip-flop 307 is coupled to an output terminal Q of the flip-flop 306. An inverse output terminal /Q of the flip-flop 307 generates the short-circuit signal $S_{OL}$. In addition, Reset input terminals R of the flip-flops 306 and 307 are both coupled to the output terminal of the comparator 305 for receiving the duty signal $S_{DUTY}$.

Accordingly, when the on-time of the power switch $Q_1$ is lower than the time threshold and the voltage level of the duty signal $S_{DUTY}$ is high-level, the flip-flops 306 and 307 will not be reset. The counting circuit counts in response to the driving signal $V_G$, the switching signal $V_{PWM}$, or the clock signal PLS. After the counting circuit counts to a predetermined time, the counting circuit generates the short-circuit signal $S_{OL}$ that the voltage level is the low-level. When the on-time of the power switch $Q_1$ is higher than the time threshold and the voltage level of the duty signal $S_{DUTY}$ is low-level, the flip-flops 306 and 307 will be reset and the voltage level of the short-circuit signal $S_{OL}$ is high-level. If the feedback signal $V_{FB}$ is higher than the limit signal $V_{LIMT}$ (referring to FIG. 2) and the voltage level of the short-circuit signal $S_{OL}$ is low-level, it means that the power supply is short-circuited. If the feedback signal $V_{FB}$ is higher than the limit signal $V_{LIMT}$ and the voltage level of the short-circuit signal $S_{OL}$ is high-level, it means that the power supply is open-looped.

Figure 4:
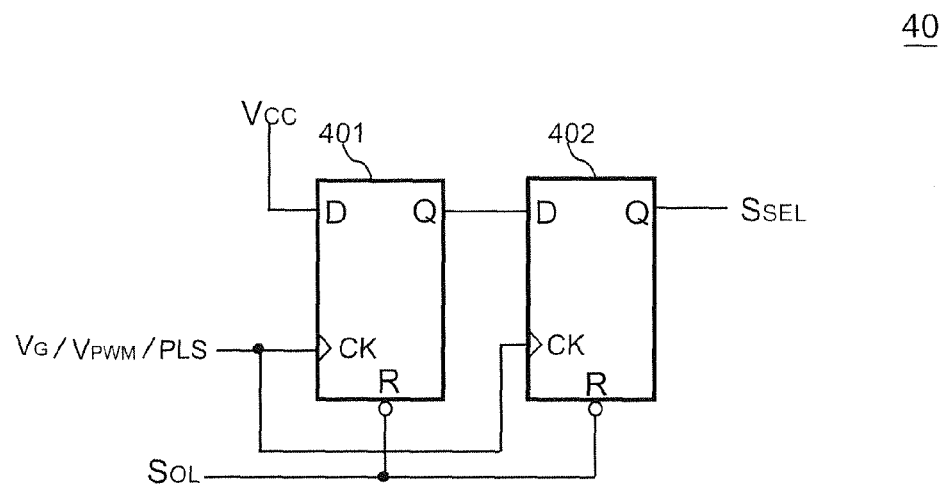
FIG. 4 shows a circuit diagram of an embodiment of the confirmation circuit according to the present invention.

FIG. 4 shows a circuit diagram of an embodiment of the confirmation circuit according to the present invention. As shown in the figure, the confirmation circuit 40 includes flip-flops 401 and 402. The confirmation circuit 40 is used for confirming the on-time of the power switch Q, in response to the short-circuit signal $S_{OL}$ for confirming the on-time of the power switch $Q_1$ is continuously higher than the time threshold and not temporarily higher than the time threshold caused by a false action of the power supply. Clock input terminals CK of the flip-flops 401 add 402 receive the driving signal $V_G$, the switching signal $V_{PWM}$, or the clock signal PLS for performing counting in response to the driving signal $V_G$, the switching signal $V_{PWM}$, or the clock signal PLS. An input terminal D of the flip-flop 401 receives the supply voltage $V_{CC}$. An input terminal D of the flip-flop 402 is coupled to an output terminal Q of the flip-flop 401. An output terminal Q of the flip-flop 402 generates the selection signal $S_{SEL}$. In addition, reset input terminals R of the flip-flops 401 and 402 both receive the short-circuit signal $S_{OL}$.

When the on-time of the power switch $Q_1$ is lower than the time threshold and the voltage level of the short-circuit signal $S_{OL}$ is low-level, the flip-flops 401 and 402 will be reset and the voltage level of the selection signal $S_{SEL}$ is low-level. When the on-time of the power switch $Q_1$ is higher than the time threshold and the voltage level of the short-circuit signal $S_{OL}$ is high-level, the flip-flops 401 and 402 will not be reset and will perform counting in response to the driving signal $V_G$, the switching signal $V_{PWM}$, or the clock signal PLS. If the on-time of the power switch $Q_1$ is higher than the time threshold during the predetermined period of the driving signal $V_G$, the switching signal $V_{PWM}$, or the clock signal PLS, it is confirmed that the on-time of the power switch $Q_1$ is continuously higher than the time threshold, and the flip-flop 402 will generate the selection signal $S_{SEL}$ with high voltage level.

Figure 5:
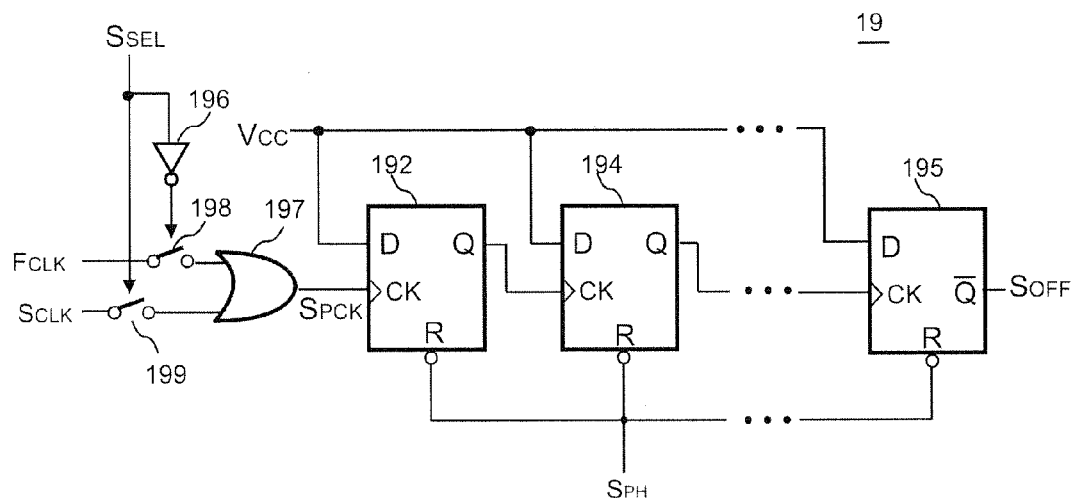
FIG. 5 shows a circuit diagram of an embodiment of the delay circuit according to the present invention.

FIG. 5 shows a circuit diagram of an embodiment of the delay circuit according to the present invention. The delay circuit 19 includes flip-flops 192, 194, . . . 195, an inverter 196, an OR gate 197, a first switch 198, and a second switch 199. One terminal of each of the first and the second switches 198 and 199 is coupled to the frequency divider 50 (as shown in FIG. 2) for receiving the first clock signal $F_{CLK}$ and the second clock signal $S_{CLK}$, respectively. The other terminal of each of the first and the second switches 198 and 199 is coupled to each of the both input terminals of the OR gate 197, respectively. The first switch 198 is controlled by the selection signal $S_{SEL}$ via the inverter 196 and transmits the first clock signal $F_{CK}$ to the OR gate 197. The second switch 199 is controlled directly by the selection signal $S_{SEL}$ and transmits the second clock signal $S_{CLK}$ to the OR gate 197. An output terminal of the OR gate 197 generates an output signal $S_{PCK}$. That is to say, the output signal $S_{PCK}$ is the first clock signal $F_{CLK}$ or the second clock signal $S_{CLK}$.

A clock input terminal CK of the flip-flop 192 is connected to the output terminal of the OR gate 197 for receiving the output signal $S_{PCK}$ (namely, the first clock signal $F_{CLK}$ or the second clock signal $S_{CLK}$). Input terminals D of the flip-flops 192, 194, . . . 195 receive the supply voltage $V_{CC}$. Each of clock input terminals CK of the flip-flops 194 and 195 is coupled to an output terminal Q of the flip-flop in the previous stage. For example, the clock input terminal CK of the flip-flop 194 is coupled to the output terminal Q of the flip-flop 192. An inverse output terminal /Q of the flip-flop 195 generates the turn off signal $S_{OFF}$. Besides, reset input terminals of the flip-flops 192, 194, . . . 195 are all coupled to the output terminal of the feedback detection circuit 16 shown to FIG. 2 for receiving the pull-high signal $S_{PH}$.

The delay circuit 19 performs counting in response to the first clock signal $F_{CLK}$, which is counting to the first delay time. The delay circuit 19 performs counting in response to the second clock signal $S_{CLK}$, which is counting to the second delay time. In other words, the delay circuit 19 controls the first switch 198 or the second switch 199 in response to the selection signal $S_{SEL}$ for controlling the flip-flop 192 to start operating in response to the first clock signal $F_{CLK}$ (or the second clock signal $S_{CLK}$. Thereby, the delay circuit 19 counts to the first delay time or to the second delay time in response to the selection signal $S_{SEL}$. When the period of the first clock signal $F_{CLK}$ is shorter than the period of the second clock signal $S_{CLK}$, the first delay time is shorter than the second delay time.

Referring to FIG. 2, when the power supply operates normally, the feedback signal $V_{FB}$ is lower than the limit signal $V_{LIMT}$. At this moment, the output terminal of the feedback detection circuit 16 will generate the pull-high signal $S_{PH}$ with the low voltage level. After the delay circuit 19 receives the pull-high signal $S_{PH}$ with the low voltage level, the flip-flops 192, 194, . . . 195 shown FIG. 5 will be reset. Thereby, the delay circuit 19 will not perform counting, and the inverse output terminal /Q of the flip-flop 195 in the last stage of the delay circuit 19 will output the turn off signal $S_{OFF}$ with the high voltage level directly. In other words, when the power supply operates normally, the voltage level of the turn off signal $S_{OFF}$ is high-level, so that the signal generating circuit 10 shown in FIG. 2 will not latch the switching signal $V_{PWM}$.

Besides, when the power supply is in the open-loop situation or the short-circuit situation, the voltage level of the feedback signal $V_{FB}$ will be pulled up to the supply voltage $V_{CC}$ (higher than the limit signal $V_{LIMT}$). Thereby, the feedback detection circuit 16 will generate the pull-high signal $S_{PH}$ with the high voltage level. The on-time detection 30 detects if the on-time of the power switch $Q_1$ is higher than the predetermined time threshold for judging whether the power supply is open-looped or short-circuited. When the on-time of the power switch $Q_1$ is higher than the time threshold, the voltage level of the short-circuit signal $S_{OL}$ is high-level, which means that the power supply is open-looped. At this time, the confirmation circuit 40 will be used for confirming that the on-time of the power switch $Q_1$ is continuously higher than the time threshold. The confirmation circuit 40 will generate the selection signal $S_{SEL}$ with the high voltage level. The delay circuit 19 will count to the second delay time in response to the selection signal $S_{SEL}$ with the high voltage level (the delay circuit 19 will perform counting in response to the second clock signal $S_{CLK}$). In addition, the inverse output terminal /Q of the flip-flop 195 in the last stage will generate the turn off signal $S_{OFF}$ with the low voltage level for the signal generating circuit 10 to latch the switching signal $V_{PWM}$. Thereby, the power supply performs open-loop protection.

On the contrary, when the on-time of the power switch $Q_1$ is lower than the time threshold, the voltage level of the short-circuit signal $S_{OL}$ is low-level, which means that the power supply is short-circuited. At this time, the confirmation circuit 40 will generate the selection signal $S_{SEL}$ with the low voltage level. The delay circuit 19 counts to the first delay time in response to the selection signal $S_{SEL}$ with the low voltage level (the delay circuit 19 performs counting in response to the first clock signal $F_{CLK}$) for generating the turn off signal $S_{OFF}$ with the low voltage level. Then the signal generating circuit 10 latches the switching signal $V_{PWM}$ in response to the turn off signal $S_{OFF}$ with the low voltage level. Thereby, the power supply performs short-circuit protection.

Figure 6B:
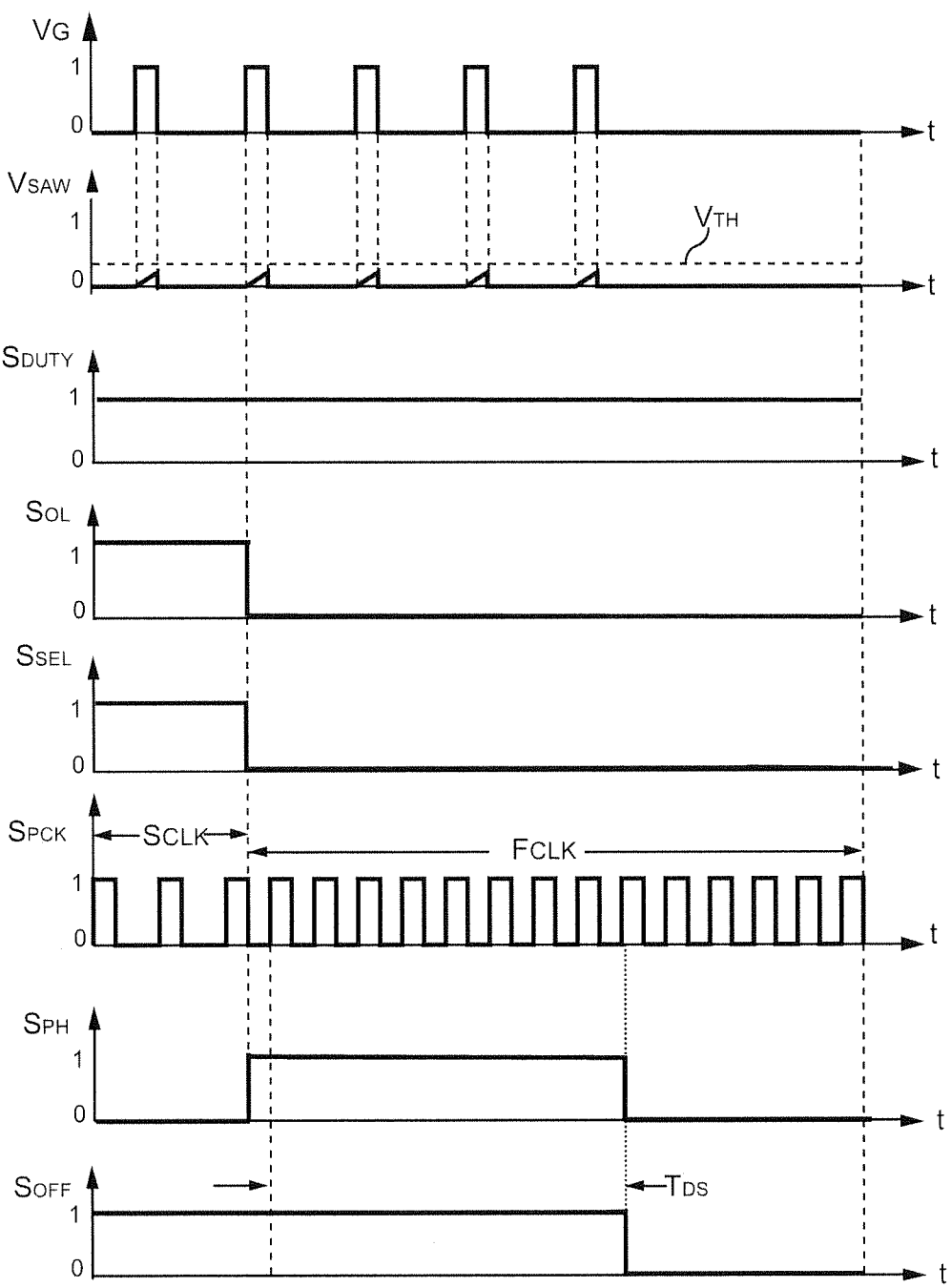

FIG. 6A and FIG. 6B show waveforms of the power supply with open-loop protection and short-circuit protection according to the present invention. As shown in FIG. 6A and referring together to FIGS. 2, 3 and 4, when the power supply operates normally, the feedback signal $V_{FB}$ is lower than the limit signal $V_{LIMT}$, and the voltage level of the pull-high signal $S_{PH}$ is low-level. The delay circuit 19 will be reset by the pull-high signal $S_{PH}$ with the low voltage level. Thereby, the delay circuit 19 will not count, but the delay circuit 19 will output directly the turn off signal $S_{OFF}$ with the high voltage level to the signal generating circuit 10. The switching signal $V_{PWM}$ is not latched, and hence the driving signal $V_G$ will not be latched. Consequently, the power supply will maintain normal operations.

As shown in FIG. 6A, when the driving signal $V_G$ starts to be enabled (the power switch $Q_1$ is turned on), the voltage level of the sawtooth signal $V_{SAW}$ increases gradually. When the driving signal $V_G$ is disenabled, the voltage level of the sawtooth signal $V_{SAW}$ is low-level. Thereby, the sawtooth signal $V_{SAW}$ is correlated to the on-time of the power switch $Q_1$. When the voltage level of the sawtooth signal $V_{SAW}$ is higher than the threshold signal $V_{TH}$, the voltage level of the duty signal $S_{DUTY}$ is pulled from high-level to low-level, and the voltage level of the short-circuit signal $S_{OL}$ is pulled from low-level to high-level. When the voltage level of the short-circuit signal $S_{OL}$ is pulled to high-level, it means that the on-time of the power switch $Q_1$ is higher than the time threshold.

Next, after the confirmation circuit 40 confirms that the on-time of the power switch $Q_1$ is continuously higher than the time threshold in response to the short-circuit signal $S_{OL}$ with the high voltage level (namely, after the voltage level of the short-circuit signal $S_{OL}$ is pulled to high-level for a period of time), the confirmation circuit 40 outputs the selection signal $S_{SEL}$ with the high voltage level. The delay circuit 19 changes the output signal $S_{PCK}$ from the first clock signal $F_{CLK}$ to the second clock signal $S_{CLK}$ in response to the selection signal $S_{SEL}$ with the high voltage level, and performs counting in response to the second clock signal $S_{CLK}$. In other words, the delay circuit 19 selects the second clock signal $S_{CLK}$ in response to the short-circuit signal $S_{OL}$ for counting. After the delay circuit 19 counts to the second delay time $T_{DL}$, the delay circuit 19 generates the turn off signal $S_{OFF}$ with the low voltage level for the signal generating circuit 10 for latching the switching signal $V_{PWM}$ (latching the driving signal $V_G$), and thus open-loop protection is performed.

Moreover, as shown in FIG. 6B, when the enabled time of the driving signal $V_G$ is short (the on-time of the power switch $Q_1$ is short), the voltage level of the sawtooth signal $V_{SAW}$ is lower than the threshold signal $V_{TH}$. At this moment, the voltage level of the duty signal $S_{DUTY}$ is high-level, which means that the on-time of the power switch $Q_1$ is lower than the time threshold. The short-circuit signal $S_{OL}$ is pulled from high-level to low-level after the counting circuit shown in FIG. 3 (including the flip-flops 306 and 307) counts for a period of time in response to the duty signal $S_{DUTY}$. The confirmation circuit 40 outputs the selection signal $S_{OL}$ with the low voltage level in response to the short-circuit signal $S_{OL}$ with the low voltage level. When the feedback signal $V_{FB}$ is higher than the limit signal $V_{LIMT}$ and the on-time of the power switch $Q_1$ is lower than the time threshold, it means that the power supply is short-circuited.

The delay circuit 19 changes the output signal $S_{PCK}$ from the second clock signal $S_{CLK}$ to the first clock signal $F_{CLK}$ in response to the selection signal $S_{SEL}$ with the low voltage level. The period of the first clock signal $F_{CLK}$ is shorter than the period of the second clock signal $S_{CLK}$. The delay circuit 19 performs counting in response to the first clock signal $F_{CLK}$. In other words, the delay circuit 19 selects the first clock signal $F_{CLK}$ in response to the short-circuit signal $S_{OL}$ for performing counting. After the delay circuit 19 counts to the first delay time $T_{DS}$, the delay circuit 19 generates the turn off signal $S_{OFF}$ with the low voltage level for the signal generating circuit 10 to latch the switching signal $V_{PWM}$ (latching the driving signal $V_G$) for performing short-circuit protection. Because the period of the first clock signal $F_{CLK}$ is short, and therefore the first delay time $T_{DS}$ is short. Thereby, when the power supply is short-circuited, the short-circuit protection can be performed immediately for avoiding occurring damages on the power supply and the application circuits of the load side.

Figure 7:
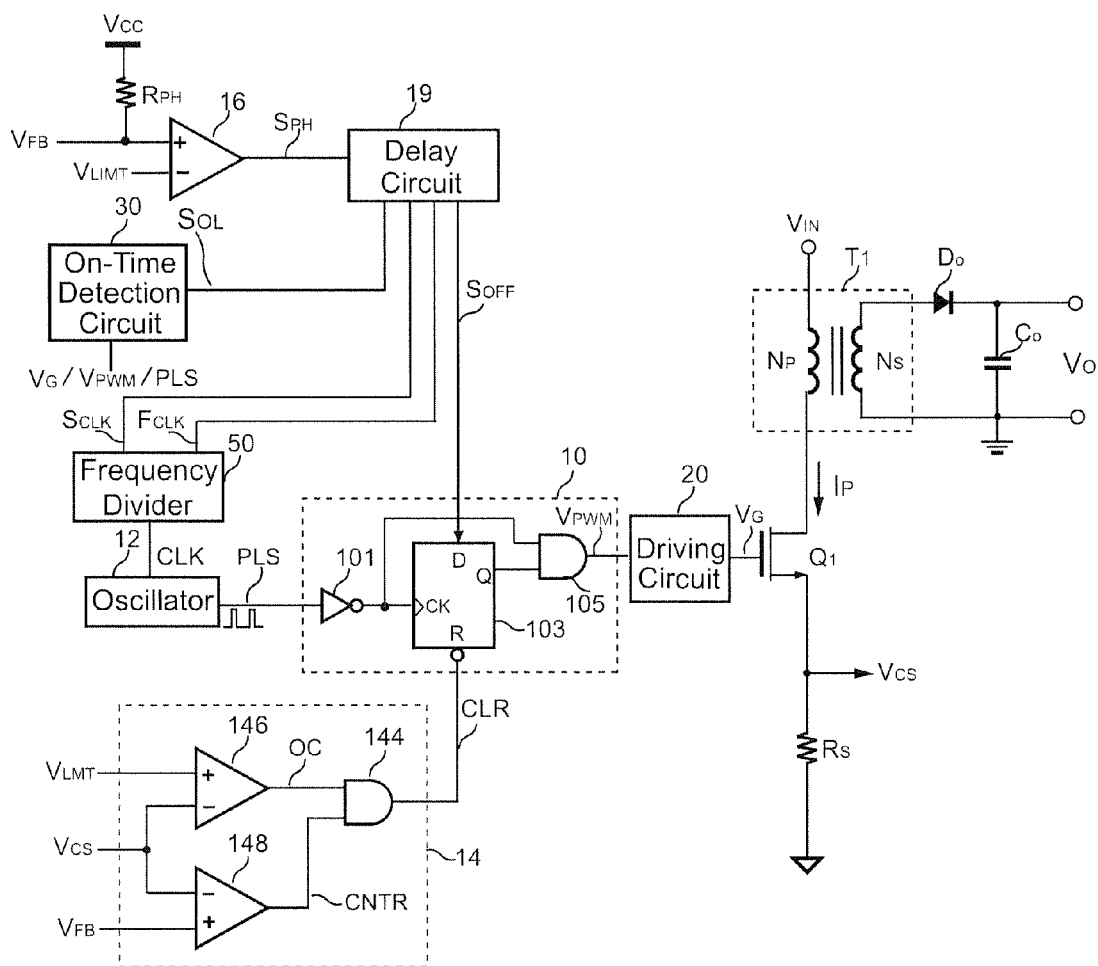
FIG. 7 shows a circuit diagram of a second embodiment of the power supply with open-loop protection and short-circuit protection according to the present invention.

FIG. 7 shows a circuit diagram of another embodiment of the power supply with open-loop protection and short-circuit protection according to the present invention. As shown in the figure, the difference between the present embodiment and the first embodiment is that the present embodiment does not include the confirmation circuit 40 (as shown in FIG. 2), and the on-time detection circuit 30 is connected directly to the delay circuit 19. Referring to FIG. 7, the short-circuit signal $S_{OL}$ outputted by the on-time detection circuit 30 is coupled to the delay circuit 19 for controlling the first switch 198 and the second switch 199 of the delay circuit 19 (as shown in FIG. 5). Thereby, the short-circuit signal $S_{OL}$ according to the present embodiment is used as the selection signal $S_{SEL}$ of FIG. 2 for selecting the first clock signal $F_{CLK}$ or the second clock signal $S_{CLK}$. When the voltage level of the sawtooth signal $V_{SAW}$ is higher than the threshold signal $V_{TH}$ (as shown in FIG. 6A), the voltage level of the duty signal $S_{DUTY}$ is low-level and the voltage level of the short-circuit signal $S_{OL}$ is high-level, which means that the on-time of the power switch $Q_1$ is higher than the time threshold. The short-circuit signal $S_{OL}$ with the high voltage level will turn on the second switch 199 (as shown in FIG. 5) for transmitting the second clock signal $S_{CLK}$ to the flip-flop 192 for performing open-loop protection.

Furthermore, when the voltage level of the sawtooth signal $V_{SAW}$ is lower than the threshold signal $V_{TH}$, the voltage level of the duty signal $S_{DUTY}$ is high-level and the voltage level of the short-circuit signal $S_{OL}$ is low-level, which means that the on-time of the power switch $Q_1$ is lower than the time threshold. The short-circuit signal $S_{OL}$ with the low voltage level will turn on the first switch 198 via the inverter 196 (as shown in FIG. 5) for transmitting the first clock signal $F_{CLK}$ to the flip-flop 192 for performing short-circuit protection.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A power supply with open-loop protection and short-circuit protection, comprising:
   a transformer, receiving an input voltage for generating an output voltage;
   a power switch, coupled to the transformer and switching the transformer for regulating the output voltage;
   a signal generating circuit, generating a switching signal for controlling switching of the power switch;
   an on-time detection circuit, detecting an on-time of the power switch for generating a short-circuit signal; and
   a delay circuit, counting to a first delay time or a second delay time in response to a feedback signal of the power supply and the short-circuit signal for generating a turn off signal for the signal generating circuit latching the switching signal;

wherein the delay circuit determines to count to the first delay time or the second delay time in response to the short-circuit signal.

2. The power supply with open-loop protection and short-circuit protection as claimed in claim 1, further comprising a confirmation circuit, confirming the on-time of the power switch being continuously higher than a time threshold and generating a selection signal in response to a reference signal and the short-circuit signal, wherein the delay circuit determines to count to the first delay time or the second delay time in response to the selection signal.

3. The power supply with open-loop protection and short-circuit protection as claimed in claim 2, wherein the reference signal is correlated to the switching signal.

4. The power supply with open-loop protection and short-circuit protection as claimed in claim 1, wherein the on-time detection circuit detects the on-time of the power switch; when the on-time is lower than a time threshold and the feedback signal is higher than a threshold signal, it means that the power supply is short-circuited and the delay circuit counts to the first delay time in response to the short-circuit signal; when the on-time is higher than the time threshold and the feedback signal is higher than the threshold signal, it means that the power supply is open-looped and the delay circuit counts to the second delay time in response to the short-circuit signal; the first delay time is shorter than the second delay time.

5. The power supply with open-loop protection and short-circuit protection as claimed in claim 1, wherein the on-time detection circuit comprises:

a sawtooth signal generating circuit, generating a sawtooth signal in response to the on-time of the power switch;

a comparator, comparing the sawtooth signal with a threshold signal for generating a duty signal; and a counting circuit, performing counting in response to a trigger signal and the duty signal and generating the short-circuit signal.

6. The power supply with open-loop protection and short-circuit protection as claimed in claim 1, further comprising:

an oscillator, generating a fundamental clock signal; and a frequency divider, receiving the fundamental clock signal and frequency-dividing the fundamental clock signal for generating a first clock signal and a second clock signal;

wherein the delay circuit selects the first clock signal or the second clock signal in response to the short-circuit signal for counting to the first delay time or the second delay time in response to the first clock signal or the second clock signal.

7. The power supply with open-loop protection and short-circuit protection as claimed in claim 1, further comprising an oscillator, generating a clock signal, and the signal generating circuit generating the switching signal in response to the clock signal.

8. The power supply with open-loop protection and short-circuit protection as claimed in claim 1, further comprising a feedback detection circuit, generating a pull-high signal in response to the feedback signal of the power supply, and the delay circuit counting to the first delay time or the second delay time in response to pull-high signal and the short-circuit signal.

9. The power supply with open-loop protection and short-circuit protection as claimed in claim 8, wherein the feedback detection circuit generates the pull-high signal in response to the feedback signal and a threshold signal.

10. The power supply with open-loop protection and short-circuit protection as claimed in claim 1, further comprising a reset circuit, generating a clear signal in response to a current signal and a power limiting signal of the power supply and the feedback signal for turning off the switching signal.

* * * * *